3,410,818
MODIFIED RESORCINOL-FORMALDEHYDE ADHESIVE RESIN AND ADHESIVES FORMED THEREWITH
Peter A. Yurcick, South River, and Charles Tyler Bills, Metuchen, N.J., assignors, by mesne assignments, to Ashland Oil & Refining Company, Ashland, Ky., a corporation of Kentucky
No Drawing. Filed Oct. 22, 1965, Ser. No. 502,320
20 Claims. (Cl. 260—29.3)

This invention relates to an improved resorcinol-formaldehyde rubber latex adhesive system for automotive tire cords, and more particularly to a novel, modified resorcinol-formaldehyde resinous composition for incorporation in such systems and to a method of making the same.

With the widespread use of synthetic fibers such as rayon, nylon and, more recently, polyesters in automotive tire cords, the rubber industry has devoted considerable effort to finding new adhesives which will satisfactorily bond such fibers to the tire body during vulcanization. Adhesive systems containing resorcinol-formaldehyde resins and rubber latex as essential active ingredients have met requirements for bonding these tire cords better than other adhesive materials, and such adhesive systems enjoy extensive commercial acceptance and use. Nevertheless, resorcinol-formaldehyde resin-rubber latex adhesives do have shortcomings as not all of the adhesive requirements in tire cord bonding are best satisfied by such adhesives.

It has now been discovered that modification of resorcinol-formaldehyde resin with a modifying agent comprising certain aromatic hydroxy carboxylic acids or amides gives a novel resinous composition which when combined with rubber latex results in tire cord adhesive systems which are superior to conventional adhesives of this type. In particular, tire cord adhesive systems utilizing the novel modified resorcinol-formaldehyde resinous composition of the present invention give better static and dynamic adhesion of synthetic tire cords, and better resistance to heat degradation of the adhesive bond formed in the tire body.

No evidence has yet been uncovered for any particular mechanism by which tire cord adhesive systems are so remarkably improved by use of the novel modified resorcinol-formaldehyde resinous composition of the invention. The art has postulated that hydrogen bonding derived from the resorcinol-formaldehyde resin in such adhesive systems or introduction of a better keying surface for rubber by means of the resorcinol-formaldehyde resin may be reasons why conventional resorcinol-formaldehyde rubber latex adhesives give good results in tire cord bonding. However, there is no one explanation which is generally accepted as being correct, and the achievement of outstandingly better results with the improved systems of the invention, likewise cannot be definitely explained. Nevertheless static and dynamic adhesion tests as well as heat durability tests have demonstrated that tire cords can be bonded in superior manner with the improved adhesive systems of the invention, giving considerably improved results over the conventional resorcinol-formaldehyde rubber latex tire cord adhesive.

In forming the novel resinous composition of the invention for incorporation in tire cord adhesive systems, condensation reaction is carried out between formaldehyde, resorcinol and a modifying agent having the formula:

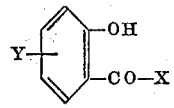

wherein X is hydroxyl or amino group and Y is hydrogen or hydroxyl group. As defined by this formula, the modifying agents used in the present invention are hydroxy derivatives of benzoic acid or amide, including for example salicylic acid, salicylamide, b-resorcylic acid, b-resorcylamide, etc. Of the various hydroxy benzoic acids or amides which can be used as a modifying agent, the salicylic and b-resorcylic acid and amide species have given outstanding results and consequently these species are especially recommended for achieving best results according to the invention.

When used in forming the modified resin of the present invention, it is believed that the carboxylic acid group of the modifying agent does not enter into the condensation reaction, but chemical union with the resorcinol-formaldehyde components is achieved via the unsubstituted reactive positions present on the benzene ring. The fact that the carboxylic acid group may remain intact in the novel modified resorcinol-formaldehyde resin may account for the unexpectedly superior adhesion results which are obtained when the modified resin is utilized to formulate adhesive compositions with rubber latex. The amide group, which reacts with the formaldehyde used in the reaction system, appears to have a still further unique effect as compared to the free carboxyl group since in actual tests the amide group resulted in higher tensile strength in the tire cord fibers.

In preparing the modified resinous composition of the invention, reaction may be carried out in one or two stages. In the one stage procedure, all of the reactants are mixed together at one time and then the reaction mixture is condensed for a suitable period of time to obtain a heat-condensed reaction product wherein all of the initial ingredients have combined chemically. In the two stage process, the modifying agent is first reacted with a portion of the total formaldehyde that is used in forming the modified resin, and thereafter this condensed material is further reacted with resorcinol and additional formaldehyde. The two stage reaction eliminates competition between the extremely reactive positions of resorcinol and the somewhat less reactive positions of the modifying agent for the total formaldehyde that is used, thus ensuring that all of the modifying agent will become chemically united with the other ingredients. For this reason, the two stage reaction is preferred.

The reaction may be carried out either in alkaline or acid medium. For alkaline condensation, alkali metal hydroxides, alkaline earth metal hydroxides and strong tertiary amines can be used as the catalyst. Generally the amount of catalyst can be anywhere from zero to about 2.0 mols per mol of resorcinol that is used in the reaction. In more preferred embodiments, the catalyst concentration may vary from zero up to about 0.5 mol per mol of resorcinol.

As for condensation on the acid side, no additional acid catalyst is actually necessary when the acid form of modifying agent is used since such acid forms possess sufficient acidity to act as both a catalyst and a reactant. However, where the amide form of modifying agent is used, or if desired in the case of the acid modifying agent, too, additional acid catalyst may be added in an amount ranging from about 0.5% to about 2% based on the total weight of resorcinol and modifying agent employed in the reaction system. Specific acid catalysts which may be used include oxalic, hydrochloric and sulfuric acids.

Where the reaction is carried out on the acid side, the product will not have adequate stability unless the final pH is adjusted to within the range of about 6 to 10 or even higher, or unless the resorcinol or both the resorcinol and the modifying agent are first prereacted with propylene oxide in which event adjustment of the final pH is not necessary. Where required, the final pH of an acid-condensed reaction product can be adjusted with any convenient alkali, such as the alkali metal hydroxides.

As regards proportions, the novel modified resorcinol-formaldehyde resinous compositions of the invention are prepared by reacting together resorcinol and with each one mol thereof from about 0.05 to about 1.5 mols of formaldehyde and from about 0.1 to about 0.4 mol of the modifying agent. Where the propylene oxide is employed for prereaction with either resorcinol alone or with both resorcinol and modifying agent, it is used in amounts ranging up to about 0.5 mol per mol of resorcinol. The amount of alkali catalyst where alkaline condensation is used, will be up to about 2.0 mols, and preferably up to about 0.5 mol, per mol of resorcinol.

As previously mentioned, the reaction may be carried out in the preferred manner of two stages. In such a two stage reaction, the whole of the amount of modifying agent and part of the total amount of formaldehyde to be used are first condensed together and this reaction may be carried out at temperatures from about 60° C. to about 105° C. At these temperatures, the reaction time will be from about 1 to 3 hours but with higher or lower reaction temperatures the reaction time will be correspondingly longer or shorter. The reaction is continued until the free formaldehyde in the mixture has dropped to 8% by weight or below. Thereafter, the resorcinol and the remaining portion of the formaldehyde are added and the reaction mixture is further condensed at temperatures from about 60° C. to 110° C. for from about ½ to 1½ hours. The reaction can be terminated when the free formaldehyde in the reaction mixture has dropped to 1% by weight or less. Where propylene oxide is prereacted with the resorcinol or the combination of resorcinol and modifying agent, the reaction temperature will slowly increase as the propylene oxide is consumed and the reaction will be completed when the reaction temperature has leveled off and no longer increases to an appreciable extent. Generally, speaking, the propylene oxide will react at gradually increasing temperatures of about 60° C. to 150° C. and reaction will be completed in from about 2 to 5 hours.

In the one stage reaction procedure, all of the reactants are mixed together, and then condensed at a temperature within the range from about 50° C. to 110° C. The reaction will usually be completed at these temperatures in from about ¾ hour to 2 hours, and when reaction has been completed, the free formaldehyde in the mixture will be 1% by weight or less. As previously pointed out, where the condensation reaction has been carried out on the alkaline side, the final product obtained will have excellent stability and no adjustment of its pH will be necessary. Where the reaction has been condensed on the acid side without first prereacting the resorcinol or the resorcinol and modifying agent with propylene oxide, it will be necessary to adjust the final pH with alkali to within the range from about 6 to 10 or even higher to achieve equivalent stability.

The reaction may be conveniently carried out in aqueous medium and, if desired, additional organic solvents may also be employed. For example, low molecular weight alcohols, ketones and esters such as methanol, acetone and ethyl acetate may be added to the reaction mixture to help dissolve the various components where such is desired or necessary.

The ranges of temperatures set forth hereinabove for the various reactions to be carried out are not critical, but instead represent workable temperature ranges in which the reaction products can be produced at a reasonably rapid rate for commercial operations. While the reactions will take place at higher or lower temperatures, problems of temperature control, excessive vaporization of reactants and uneconomical manufacturing output may be encountered which make the higher or lower temperatures less desirable.

The reaction products are clear resinous solutions usually having a reddish color and containing about 75% by weight of solids. These reaction products can be mixed with the usual forms of rubber latex in aqueous dispersion that are used in conventional resorcinol-formaldehyde latex tire cord adhesives. Among the various forms of rubber latex that may be employed are included styrene-butadiene latex, styrene-butadiene-vinyl pyridine terpolymer latex, butadiene latex and others which are known to the art. The range of proportions in 100 parts by weight of the mixture of rubber latex and the novel modified resorcinol-formaldehyde resin of the invention may be from 5 to 95 parts of the rubber latex and correspondingly from 95 to 5 parts of the modified resin. Other conventional ingredients such as alkali and formaldehyde may be included in the final adhesive system in known manner.

The following examples will illustrate further details of the invention and represent the best known embodiments thereof.

Example 1

A mixture of 980 grams of 44% aqueous formaldehyde solution, 38.5 grams of methanol, 250 grams of water, 3,000 grams of resorcinol, 298 grams of b-resorcylic acid and 248 grams of 24.3% aqueous sodium hydroxide solution was heated to initiate an exothermic reaction which raised the temperature to reflux (99° C.). Reflux was continued for one hour after which the reaction mixture was cooled and poured into a suitable container. The resultant product was a clear, reddish-colored resin solution containing 70% solids having a viscosity of 5 poises at 25° C.

Example 2

A mixture of 148 grams of salicylic acid, 391 grams of 44% aqueous formaldehyde solution and 248 grams of 24.3% of aqueous sodium hydroxide solution was heated to 70° C. and condenses at that temperature for one hour. The resultant product was cooled to 50° C. and 3,000 grams resorcinol, 509 grams of 44% aqueous formaldehyde solution, 38.5 grams of methanol and 25 grams of water were added. As the mixture was heated an exothermic reaction developed which raised the temperature to reflux (103° C.). The reflux was continued for one-half hour and then the reaction mixture was cooled. The resultant product had a viscosity of 8.7 poises at 25° C. and containetd 80% solids.

Example 3

Example 2 was repeated except that salicylamide was substituted in place of salicylic acid. The product obtained with salicylamide as the modifying agent had physical characteristics and an appearance similar to that of the acid-modified product of Example 2.

Example 4

A standard resorcinol-formaldehyde rubber latex tire cord adhesive consisting of a resorcinol-formaldehyde resin and styrene-butadiene rubber latex was tested for static and dynamic adhesion and heat durability in bonding nylon and polyester tire cords during vulcanization. The same tests were repeated for a tire cord adhesive formulated by substituting the reaction products of Examples 1, 2 and 3 in place of the resorcinol-formaldehyle resin in the conventional adhesive. In each case, the adhesives containing the reaction products of Examples 1, 2 and 3 gave superior bonding in these tests, particularly with regard to the dynamic adhesion and the heat durability which were materially greater than obtained with the conventional adhesive.

While the invention has now been described specifically in terms of bonding automotive tire cords, and the most outstanding results have been achieved in connection with such use, it will be obvious to those skilled in the art that the products of the invention have many other applications as well. For example, the novel modified resorcinol-formaldehyde resins of the invention and adhesive compositions in which they are incorporated may be used in the manufacture of seals, diaphragms, piping, belting and hose and in any other applications where a permanent bond between rubber and reinforcing cords or fabrics or between non-rubber surfaces is desired.

It will be further understood that it is intended to cover all changes and modification of the preferred embodiments of the invention, herein chosen for the purpose of illustration, which do not constitute departures from the spirit and scope of the invention.

What is claimed is:

1. An adhesive composition particularly adapted for bonding automotive tire cords which comprises a rubber latex and in mixture therewith a reaction product of the relative proportions of one mol of resorcinol, from about 0.05 to about 1.5 mols of formaldehyde and from about 0.01 to about 0.4 mol of modifying agent having the formula:

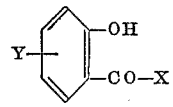

wherein X is hydroxyl or amino group and Y is hydrogen or hydroxyl group.

2. An adhesive composition as in claim 1 in which the relative weight proportions of said rubber latex and said reaction product per 100 parts of the mixture thereof are from 5 to 95 parts of said rubber latex and from 95 to 5 parts of said reaction product.

3. An adhesive composition as in claim 1 in which said reaction product includes as an integral, reacted component up to about 0.5 mol of propylene oxide per mol of resorcinol.

4. An adhesive composition as in claim 3 in which the pH of said reaction product is less than 6.

5. An adhesive composition as in claim 1 in which the pH of said reaction product is from about 6 to about 10.

6. An adhesive composition as in claim 1 in which said rubber latex is styrene-butadiene latex.

7. An adhesive composition as in claim 1 in which said rubber latex is styrene-butadiene vinyl pyridine terpolymer latex.

8. An adhesive composition as in claim 1 in which the modifying agent is salicylic acid or amide.

9. An adhesive composition as in claim 1 in which the modifying agent is b-resorcylic acid or amide.

10. A resinous composition particularly adapted for incorporation in tire cord adhesives which comprises a reaction product of the relative proportions of one mol of resorcinol, from about 0.05 to about 1.5 mols of formaldehyle and from about 1.01 to about 0.4 mol of a modifying agent having the formula:

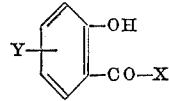

wherein X is an amino group and Y is hydrogen or hydroxyl group.

11. A resinous composition as in claim 10 in which said reaction product includes as an integral, reacted component thereof up to about 0.5 mol of propylene oxide per mol of resorcinol.

12. A resinous composition as in claim 11 having a pH less than 6.

13. A resinous composition as in claim 10 having a pH of from about 6 to about 10.

14. A resinous composition as in claim 10 in which the modifying agent is the amide of salicylic acid.

15. A resinous composition as in claim 11 in which the modifying agent is the amide of b-resorcylic acid.

16. The method of forming a resinous composition for incorporation in tire cord adhesives which comprises reacting relative proportions of one mol of resorcinol with from about 0.05 to about 1.5 mols of formaldehyde and with about 0.01 to about 0.4 mol of a modifying agent having the formula:

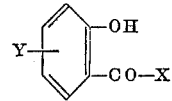

wherein X is an amino group and Y is hydrogen or hydroxyl group, said reaction being conducted at a temperature within the range from about 50° C. to 110° C., until the free formaldehyde concentration in the reaction mixture is not more than about 1% by weight.

17. The method as in claim 16 in which said reaction is carried out in the presence of up to about 2.0 mols of alkaline catalyst per mol of resorcinol, said catalyst being selected from the group consisting of alkali metal hydroxides, alkaline earth metal hydroxides and tertiary amines.

18. The method as in claim 16 which includes the step of adjusting the pH of the final reaction product to within the range of about 6 to about 10 by addition of alkali.

19. The method as in claim 16 which includes the steps of first reacting all of the modifying agent with a portion of all of the formaldehyde to be employed for the entire reaction, said first reaction being continued until the free formaldehyde concentration has been reduced at least to about 8% by weight, and thereafter completing the reaction with the remaining portion of formaldehyde and with the resorcinol.

20. The method as in claim 16 which includes the step of causing up to about 0.5 mol of propylene oxide per mol of resorcinol to take part in said reaction.

References Cited

UNITED STATES PATENTS

| | | | |
|---|---|---|---|
| 1,826,094 | 10/1931 | Schuette | 260—54 |
| 2,571,117 | 10/1951 | De Groote | 260—29.3 |
| 2,981,710 | 4/1961 | Hoenel | 260—29.3 |
| 3,298,985 | 1/1967 | Bills et al. | 260—29.3 |

MURRAY TILLMAN, *Primary Examiner.*

J. C. BLEUTGE, *Assistant Examiner.*

UNITED STATES PATENT OFFICE
CERTIFICATE OF CORRECTION

Patent No. 3,410,818                                               November 12, 1968

Peter A. Yurcick et al.

It is certified that error appears in the above identified patent and that said Letters Patent are hereby corrected as shown below:

Column 3, line 9, "0.1" should read -- 0.01 --. Column 5, line 54, "1.01" should read -- 0.01 --.

Signed and sealed this 10th day of March 1970.

(SEAL)
Attest:

Edward M. Fletcher, Jr.                              WILLIAM E. SCHUYLER, JR.
Attesting Officer                                           Commissioner of Patents